Patented Dec. 9, 1941

2,265,791

UNITED STATES PATENT OFFICE 2,265,791

GREASE COMPOSITION AND METHOD FOR MAKING SAME

John C. Zimmer, Union, and Arnold J. Morway, Rahway, N. J., assignors to Standard Oil Development Company, a corporation of Delaware No Drawing. Application April 6, 1939, Serial No. 266,416

10 Claims. (Cl. 252—33)

The present invention relates to improved grease composition and to methods for making the same. The nature of the product and the best method of manufacture will be fully understood from the following description.

The invention deals with an improved grease composition especially for lubrication at high temperatures, for example; at temperatures above 300° F. It will be understood that the grease composition is satisfactory for lower temperature operations and is therefore particularly adapted for operations in which a wide range of temperatures is encountered. Lubrication at high temperature is obviously difficult and the greases used at the present time are usually the so-called fiber or block greases. These contain large amounts of soda soaps usually of tallow or of other fats rich in stearin. The grease is hard and is ordinarily employed in a brick or block form. It has a high melting point of 350° to 400° F., depending on its composition, and the amount of soap running from 20 to 50% is varied in order to obtain the desired melting point. The material is extremely dry and hard and while satisfactory for operation of extremely heavy bearings, such as heavy journal bearings, it is useless for ball or roller bearings which require a soft, unctuous product. When such devices are to be lubricated at high temperatures, it is necessary that a soft structure be maintained at an elevated temperature and this is the chief difficulty with the present known greases. Those which are sufficiently soft at the lower temperatures have low melting points and become fluid at the high temperatures and those, on the other hand, which are sufficiently fluid at high temperatures become so hard as to be useless at lower temperatures. It has been found that these difficulties are solved by a grease which is soft throughout its entire range and has a high melting point, as high as those of the usual block grease type. Such a grease can be prepared from soaps derived from raw rapeseed oil, that is from the unblown oil, or from the acids obtained therefrom, in place of tallow, stearic acid and other fats rich in stearin. Grease made with the unblown rapeseed oil is soft and maintains this quality throughout its entire range up to a melting point which may be as high as 400° or 450° F. It is thus admirably adapted for the lubrication of cams, ball and roller bearings, rocker arms and other mechanical devices which require a soft grease of this type.

In manufacturing the present grease, the rapeseed oil, amounting to 10 to 50% by weight of the grease to be made, is placed in a fired kettle of the type familiar to grease manufacturers. The oil to be used is the raw or unboiled rapeseed oil and it should be understood that this is important since the boiled oil will not give the desired properties. If desired, it will be understood that the acids obtained from the raw rapeseed oil can be used instead of the oil itself and in this case an absolutely glycerin-free product will be insured. It is desirable also to add a small quantity of an oil soluble sulfonic compound derived from petroleum. This may be the acid or an alkali metal soap. The amount of such material is from ¼ to about 2% of the finished grease. The function of this material is not completely understood but it increases the soft and unctous quality of the grease and assists in maintaining it throughout the high temperatures after water has been completely driven off. Mineral oil is also added to the extent of about an equal quantity of the rapeseed oil used. These materials are thoroughly mixed in the fired kettle and heated to about 150° when aqueous caustic soda, which may be conveniently used in a 25% solution, is added in sufficient quantity to saponify the rapeseed oil completely. It is also desirable to provide a very slight excess of the alkali, for example, ½ to 1%, which assists in raising the melting point of the grease. Heating is continued and temperature is gradually raised to drive off moisture so that the product in the kettle becomes thick, heavy and pasty or doughy. Small portions of mineral oil are then added and all of the mineral oil, which will amount to 50 or 90% of the final grease, is to be added before the temperature of 500° F. is reached. The final temperature will vary somewhat with different compositions, but ordinarily it is from about 500 to 520° F. On reaching this temperature the product is cooled, while stirring, down to a temperature of about 200° F., when the grease may be run out of the container. It is important to obtain a final high temperature and if it is not sufficiently high, a hard, dry, rubbery product results, which has little lubricating value. On the other hand, if the high temperature is obtained just as disclosed, a soft unctuous material is produced and this product is stabilized by the slow cooling and stirring.

As produced above, the grease has some fibrous structure and it has been observed that this is lost to a large extent on standing for a few weeks in the cold.

The grease differs considerably from the hard, long fiber block greases described hitherto although it is, like them, anhydrous and has a high melting point. This peculiar combination of qualities is largely due to the use of the raw or unboiled rapeseed oil as a source of the soap, and to a lesser degree to the presence of 0.1 to 1.0% of free alkali and the oil soluble sulfonate which apparently fulfil the function of the traces of water present in the low melting aqueous greases, but being non-volatile it cannot be lost like water.

The qualities of the grease may be modified by adjustment of the proportions of the various ingredients as in all cases the melting point is increased by increasing the amount of soda soap, and the hardness or firmness is likewise increased, but in the present grease this does not take place to the degree observed in greases made from fats, such as tallow, and a grease of the present type containing 45 to 50% of soap is still sufficiently soft for use in ball and roller bearings. Ordinarily the amount of soap varies from 10 to 50%, the mineral oil content from 50 to 90% with ¼ to 2% of the oil soluble sulfonate, and preferably with a small excess, less than 1%, of free alkali.

The rapeseed oil soap is preferably the only soap present with the exception of the small amount of sulfonate which may also be termed as "soap," but the composition may be modified by small additions of other soaps if it is desired to harden the product for some special purpose. The other soaps employed may be soaps of rosin, tallow or other fats and they should not be used to an extent of more than 10 or 20% at the most since they have the effect of hardening the grease and will to some extent diminish the valuable properties obtained when rapeseed oil is employed alone.

The oil employed in producing the present grease may be derived from paraffinic, naphthenic or mixed base crudes; both distillates and residuals may be employed and they may be refined by the conventional acid, alkali and clay methods or by solvent extraction with solvents such as phenol, furfural or the like, or they may be refined by hydrogenation. If residual oils are employed, it is usually desirable to first refine these materials with propane or butane in order to remove asphaltic and resinous constituents.

The grease may contain other additional substances such as oxidation inhibitors, especially amino compounds, extreme pressure agents containing sulfur, if the service so demands, dyes, thickness or adhesive agents such as polyisobutene polymers and other substances for particular purposes without departing from the spirit of the present invention.

*Example*

20 parts by weight of rapeseed oil are mixed with 25 parts of hydrocarbon lubricating oil and .50 part of an oil soluble sodium sulfonate, obtained from petroleum by treatment with strong sulfuric acid, and then neutralized with caustic soda. This mixture was heated while stirring to about 150° F. whereupon a 25% solution of caustic soda was added, the amount being about 4.5 parts of dry NaOH. The mixture was heated and stirred until the water was driven off, and then additional amounts of a hydrocarbon lubricating oil were added up to a total of 75 parts including the original 25 parts. All of this oil was added before a temperature of 500° F. was reached and the mixture was heated to about 500° F. and then allowed to cool while stirring to about 200° F., and was then drawn off at that temperature.

The above product was then tested to determine the hardness at different temperatures. A. S. T. M. penetrations were taken over a wide range of temperatures with the following results:

A. S. T. M. penetration at 77° F _____ 192
A. S. T. M. penetration at 200° F _____ 315
A. S. T. M. penetration at 250° F _____ 365
A. S. T. M. penetration at 300° F _____ 385
A. S. T. M. penetration at 350° F _____ 393
A. S. T. M. penetration at 400° F _____ 365
A. S. T. M. penetration after working at 77° F _____ 190

The data clearly shows the uniformity of the grease at temperatures between 300° and 400° F.; and even as low as 200° F. the material is not substantially harder. This is a most important quality for ball bearing greases for use at temperatures between 200° and 400° F., and one which is most lacking in the present commercially employed greases.

The grease was then subjected to a test of the bearing engineers committee. The machine and the method of test were presented in a paper by Charles R. Gillette before the fourth annual convention of the National Association of Lubricating Grease Manufacturers, Inc., held on October 12 and 13, 1936, at Chicago, Illinois.

The procedure in the particular case was not exactly the same as that specified for the test, since it was found to be insufficiently rigorous, and the machine was run for four hours at a constant temperature of 350° F., with the following results:

Maximum torque _____ 108 gr. cm.
Minimum torque _____ 69 gr. cm.
Final color _____ Unchanged from original
Leakage of grease through bearing seal _____ None
Oil separation _____ None
Final structure of grease after cooling _ Unchanged from original
Penetration before test _____ 41
Penetration after test_ 39.

The testing machine and the procedure may be described as follows:

"The machine consists of a base, a vertical column, a constant speed 3450 R. P. M. motor and an extension to the motor spindle, upon which is mounted a plate shielded, Conrad type, size 204 S. A. E. bearing. This bearing is mounted in a grease cup which is free to turn with the bearing. A flexible cord connecting this cup with the torque scale spring, provides a means for determining the torque. The grease cup is surrounded by an oil bath which is a counterweighted, adjustable container in which the oil is maintained at the various test temperatures. The oil temperature is recorded by the dial type thermometer.

"The test procedure consists of mounting the bearing upon the shaft with the shield side down and packing the test quantity of grease into the bearing and around the shaft. The grease cup is then assembled on the bearing and the grease in the cup leveled off.

"The oil bath is raised to the stop on the column, with the damping vane on the grease cup in front.

"The flexible cord from the torque spring is attached to the cup by means of the slot provided.

"During all of these tests, separation of oil and soap, change in structure, change in consistency and aeration are noted, in addition to the torque readings."

The present invention is not limited to any theory of the process of grease manufacture, nor to any specific grease formula or use therefor but only to the following claims in which it is desired to claim all novelty in the invention.

We claim:

1. An improved lubricating grease adapted for lubrication of ball and roller bearings at high temperatures, comprising a major quantity of mineral lubricating oil, sodium soap of a raw rapeseed oil, and an excess of free alkali over that necessary to completely saponify the rapeseed oil, the quantity of the rapeseed soap being between 10 and 50% of the mixture, and the whole thoroughly incorporated to form a soft, short fiber grease having a melting point above 350° F., and substantially anhydrous.

2. An improved lubricating grease adapted for lubrication at high temperatures, comprising mineral lubricating oil, a small quantity of an oil soluble sodium sulfonate derived from petroleum, soda soap of raw rapeseed oil containing excess alkali, the grease being substantially anhydrous, soft and unctuous and maintaining these qualities from room temperature to approximately the melting point of the grease.

3. Product according to claim 2 in which the rape-seed oil soap is present in an amount of 10 to 50%, the sulfonate from ¼ to 2%, and the free alkali from 0.1 to 1.0%.

4. Product according to claim 2 comprising 20% of soap of raw rapeseed oil, about ½% of oil soluble sodium sulfonate, and about 0.5% free alkali, and the balance a mineral lubricating oil.

5. An improved process for manufacturing grease suitable for lubrication at elevated temperatures, comprising saponifying raw rapeseed oil with caustic soda in the presence of hydrocarbon oil by heating, in the presence of an excess of free alkali, so as to dehydrate the material and adding additional mineral oil while stirring and heating to a temperature between about 480 and 520° F., then cooling the mixture.

6. Process according to claim 5 in which an oil soluble sodium sulfonate is incorporated into the product during dehydration.

7. Process for making an improved grease composition for lubrication at elevated temperatures, comprising heating a mixture of mineral lubricating oil, a small amount of oil soluble sodium sulfonate, derived from petroleum, and rapeseed oil, adding aqueous sodium hydroxide in a slight excess over that necessary to completely saponify the rapeseed oil, further heating to saponify the rapeseed oil and dehydrating the mixture, adding additional mineral oil and continuing the heating to about 500° F., while stirring, and then cooling the compound.

8. Process according to claim 7 in which approximately equal volumes of mineral oil and rapeseed oil are originally admixed and approximately two additional volumes of mineral oil are added after saponification and dehydration.

9. An improved lubricating grease adapted for lubrication of ball and roller bearings at high temperatures, comprising a major quantity of mineral lubricating oil, sodium soap of a raw rapeseed oil, a small amount of an oil soluble sodium sulfonate derived from petroleum by treatment with sulfuric acid, and an excess of free alkali over that necessary to completely saponify the rapeseen oil, the quantity of the rapeseed soap being between 10 and 50% of the mixture, and the whole thoroughly incorporated to form a soft, short fiber grease having a melting point above 400° F., and substantially anhydrous.

10. An improved process for manufacturing grease suitable for lubrication at elevated temperatures, comprising saponifying raw rapeseed oil with caustic soda in the presence of a hydrocarbon oil by heating, in the presence of an excess of free alkali, so as to dehydrate the material and adding additional mineral oil while stirring and heating to a temperature between 480° and 520° F., then cooling the mixture, to form a grease which is substantially anhydrous, soft and unctuous from room temperature to approximately the melting point of the grease.

JOHN C. ZIMMER.
ARNOLD J. MORWAY.